US010828851B2

(12) United States Patent
Kismarton et al.

(10) Patent No.: US 10,828,851 B2
(45) Date of Patent: Nov. 10, 2020

(54) SLIP SHEET WITH COMPENSATION SURFACE

(71) Applicant: The Boeing Company, Chicago, IL (US)

(72) Inventors: Max U. Kismarton, Renton, WA (US); Karl Marius Nelson, Issaquah, WA (US); Geoffrey Allen Butler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 601 days.

(21) Appl. No.: 15/662,969

(22) Filed: Jul. 28, 2017

(65) Prior Publication Data

US 2019/0030839 A1    Jan. 31, 2019

(51) Int. Cl.
| | | |
|---|---|---|
| *B32B 41/00* | (2006.01) | |
| *B29C 70/54* | (2006.01) | |
| *B29D 99/00* | (2010.01) | |
| *B29C 70/30* | (2006.01) | |
| *B29C 70/34* | (2006.01) | |
| *B29L 31/30* | (2006.01) | |

(52) U.S. Cl.
CPC .............. *B29C 70/54* (2013.01); *B29C 70/30* (2013.01); *B29C 70/345* (2013.01); *B29D 99/001* (2013.01); *B29L 2031/3085* (2013.01)

(58) Field of Classification Search
CPC ....... B29C 70/54; B29C 70/30; B29C 70/345; B29D 99/001; B29L 2031/3085; B64F 5/10
USPC .......................... 156/64, 350, 351, 378, 379
See application file for complete search history.

(56) References Cited

U.S. PATENT DOCUMENTS

| | | | |
|---|---|---|---|
| 2011/0031433 A1* | 2/2011 | Burchell | B29C 70/025 |
| | | | 252/62.56 |
| 2014/0322381 A1* | 10/2014 | Bland | B29C 70/205 |
| | | | 425/394 |
| 2016/0325468 A1* | 11/2016 | Foss | B29C 33/3835 |

OTHER PUBLICATIONS

"COMPRO Simulation Software," Convergent Manufacturing Technologies Inc., copyright 2017, Accessed Jul. 28, 2017, 2 pages. http://www.convergent.ca/products/compro-simulation-software.

* cited by examiner

*Primary Examiner* — Michael N Orlando
*Assistant Examiner* — Joshel Rivera
(74) *Attorney, Agent, or Firm* — Yee & Associates, P.C.

(57) ABSTRACT

A method and an apparatus are presented. The method locally compensates for cure related deformations in a composite skin by laying up a composite material on a compensation surface of a slip sheet designed to form a modified outer mold line different from a designed shape, wherein the slip sheet is held against a forming surface of a layup tool, wherein the forming surface is designed to form an outer mold line of the designed shape.

22 Claims, 13 Drawing Sheets

SLIP SHEET WITH COMPENSATION SURFACE

BACKGROUND INFORMATION

1. Field

The present disclosure relates generally to composite manufacturing, and more specifically, to manufacturing of composite skins. Still more particularly, the present disclosure relates to a slip sheet with a compensation surface configured to provide a modified mold surface for composite skins.

2. Background

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resin are arranged and cured to form a composite material. Due to the controlled direction of fibers in a composite material, composite materials are anisotropic. Anisotropic materials have different values for a physical property in different orientations.

To build a large composite structure, a composite skin is first laid up, cured, and cooled, and then secured to a support structure. A composite skin is a sheet of composite material and may be fabricated to have any desirable shape, including complex curvatures.

As the composite skin cools from a cure temperature, the composite skin may change geometry or "deform." Deformation of the composite skin results from differing coefficients of thermal expansion with respect to the three principle axes or orientations of the composite skin due to the anisotropic nature of composite materials. Deformation of the composite skin also results from cure shrinkage due to chemical changes during curing. Deformation of the composite skin after cure often occurs in more than one orientation.

During joining of the composite skin to the support structure, fasteners apply forces to the composite skin. Forces applied by the fasteners may attempt to compensate for any deformations in the composite skin that occur after curing.

At least one of a limit for the composite skin or a limit for the support structure sets a maximum allowable amount of force applied by each of the fasteners. After joining the composite skin to the support structure by applying at most the maximum allowable amount of force by each of the fasteners, a plurality of gaps remains between the composite skin and the support structure.

Shims are positioned between the composite skin and the support structure within the plurality of gaps. Manufacturing and positioning the shims adds to manufacturing time and cost.

Therefore, it would be desirable to have a method and apparatus that takes into account at least some of the issues discussed above, as well as other possible issues.

SUMMARY

An illustrative embodiment of the present disclosure provides a system. The system comprises a layup tool and a slip sheet. The layup tool has a forming surface designed to form an outer mold line for a composite material. The slip sheet has a compensation surface configured to provide a modified outer mold line for the composite material and a complementary surface configured to rest on the forming surface. The compensation surface differs from the forming surface due to differences in thickness of the slip sheet. The compensation surface is opposite the complementary surface.

Another illustrative embodiment of the present disclosure provides a method. A composite plate with a complementary surface is created. The complementary surface is complementary to a forming surface of a layup tool. The forming surface is configured to form an outer mold line for a composite material. Differences in thickness are formed into the composite plate to form a compensation surface of the slip sheet opposite the complementary surface. The compensation surface is configured to provide a modified outer mold line for the composite skin. The compensation surface differs from the forming surface due to the differences in thickness of the slip sheet.

A further illustrative embodiment of the present disclosure provides a method. Cure related deformations in a composite skin are locally compensated for by laying up a composite material on a compensation surface of a slip sheet designed to form a modified outer mold line different from a designed shape, wherein the slip sheet is held against a forming surface of a layup tool, wherein the forming surface is designed to form an outer mold line of the designed shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
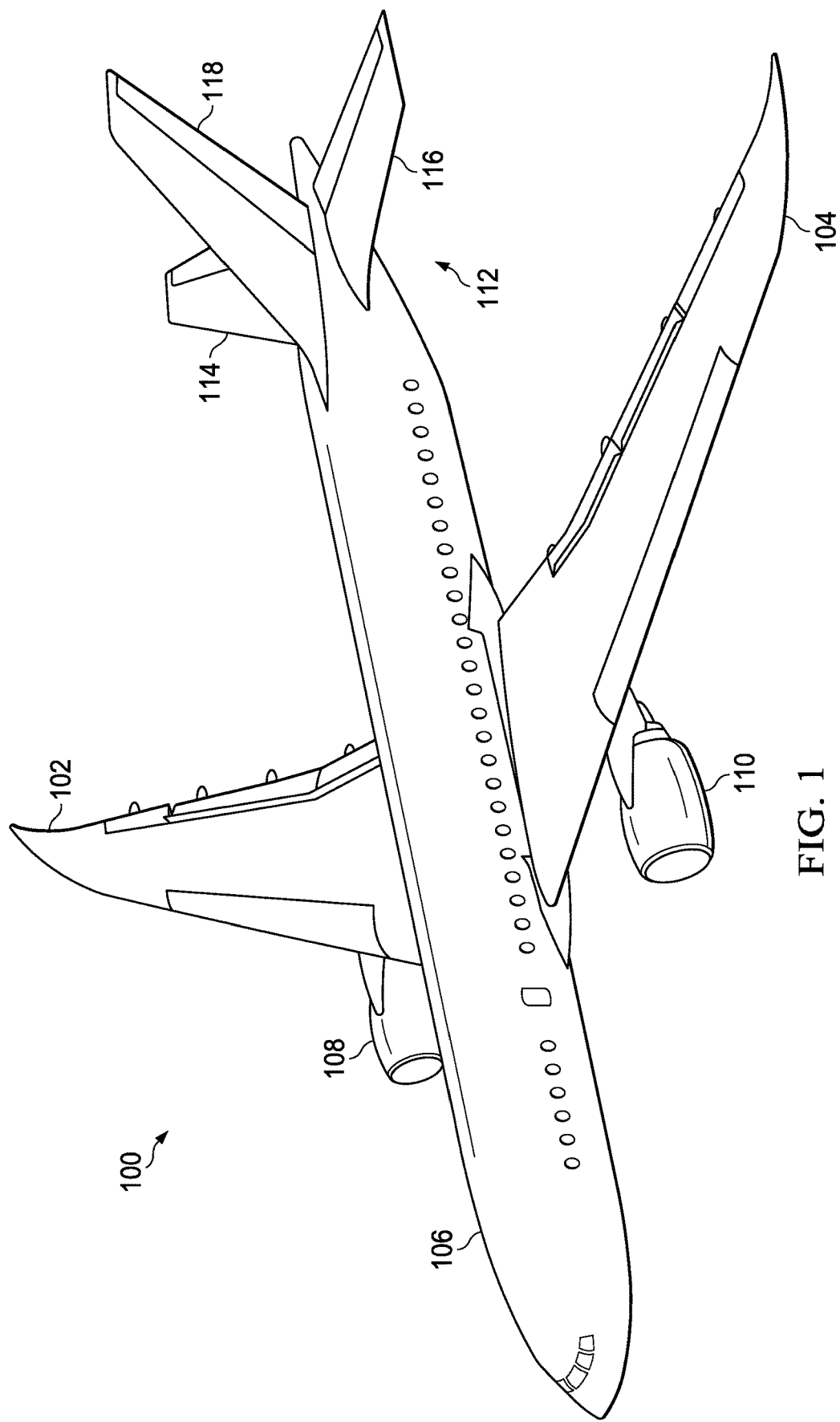
FIG. 1 is an illustration of an aircraft in which an illustrative embodiment may be implemented.

The illustrative embodiments recognize and take into account one or more different considerations. For example, the illustrative embodiments recognize and take into account that composite wing skins deform or warp in several directions when they are removed from the layup tool. The illustrative examples recognize and take into account that the deformation of the composite wing skin causes distortion from a desired geometry.

The illustrative examples recognize and take into account that in some specific conventional aircraft wing skins, there is a deformation in the span-wise direction of up to 20 inches. The illustrative examples recognize and take into account that span-wise direction runs along a wing from the wingtip to the wingroot. The illustrative examples recognize and take into account that in some specific conventional aircraft wing skins there is a deformation in the chord-wise direction of up to 4 inches. The illustrative examples recognize and take into account that chord-wise direction is perpendicular to the span-wise direction.

The illustrative examples recognize and take into account that conventional maximum allowable pull up load (MAPL) per fastener for an aircraft wing assembly during assembly gap check & fit-up is in the range of 50 to 200 lbs per fastener, using one fastener per shear tie. The illustrative examples recognize and take into account that conventional maximum allowable pull up load (MAPL) per fastener varies depending on the local skin gage.

The illustrative examples recognize and take into account that in some conventional aircraft wings thousands of shims may be positioned during the wing assembly process. The illustrative examples recognize and take into account that thousands of shims are located between the composite skin panels and spars and ribs of the wing box. The illustrative examples recognize and take into account that it may be undesirably expensive to measure, machine and install thousands of shims during the wing assembly process.

The illustrative examples recognize and take into account that in some specific conventional aircraft wings there are deformations that may be compensated for under clamped-up conditions. The illustrative examples recognize and take into account that when a composite skin is positioned on an assembly tool, gravity alone takes most of the distortions out of the composite skin.

The illustrative examples recognize and take into account that gravity and acceptable forces applied at the rib fasteners can compensate for many of the warping/distortions that are present. The illustrative examples recognize and take into account that there are residual, small gaps between the composite skin and the support structure that would use undesirably large forces to close. The illustrative examples recognize and take into account that those undesirably large forces are not allowed.

The illustrative examples recognize and take into account that the composite skin will pull up to the desired shape in many of locations. The illustrative examples recognize and take into account that there are some locations in which the maximum allowable force will not eliminate the gaps.

The illustrative examples recognize and take into account that in some composite wings, the first and last shear ties, located right next to the front and rear spars, have a gap running along the leading edge and trailing edge. The illustrative examples recognize and take into account that a gap along the leading edge and trailing edge may only be a fraction of an inch. The illustrative examples recognize and take into account that the gap running along the leading edge and trailing edge may be greater than gaps positioned elsewhere in the composite wing skin. The illustrative examples recognize and take into account that the gap running along the leading edge and the trailing edge may be up to 0.15 inches. The illustrative examples recognize and take into account that the leading edge or trailing edge may be up to 50 to 80 feet along the wing. The illustrative examples recognize and take into account that each of the leading edge and trailing edge having the gaps may have a length of up to 12 inches into the center of the wing.

The illustrative examples recognize and take into account that wing skin layup tools incur significant flow time and cost during their fabrication. The illustrative examples recognize and take into account that because of the long lead time, wing skin layup tools are manufactured early in the design of an aircraft. The illustrative examples recognize and take into account that occasionally design changes are made to the aircraft after design and fabrication of the wing skin layup tools has begun. The illustrative examples recognize and take into account that design changes to the aircraft make changing the forming surface of the wing skin layup tool desirable. The illustrative examples recognize and take into account that conventionally, changing a forming surface of the wing skin layup tool requires fabrication of a new wing skin layup tool. The illustrative examples recognize and take into account that the long lead time limits the design flexibility for making changes that may be desirable when manufacturing a wing or other composite structures.

The illustrative examples recognize and take into account that it would be desirable to provide additional flexibility for design changes over conventional processes. The illustrative examples recognize and take into account that it would be desirable to reduce at least one of manufacturing costs or shimming costs.

The illustrative examples recognize and take into account that it is desirable to provide a tooling system that is at least one of simpler, lower cost, or more flexible than past solutions. The illustrative examples recognize and take into account that it is desirable to produce composite skins that require less pull-up forces to conform to a desired shape. The illustrative examples recognize and take into account that requiring less pull-up forces to conform to a desired shape reduces the quantity of shims during assembly.

The illustrative examples recognize and take into account that a composite skin has two large surfaces, a first surface contacting the support structure and a second surface opposite the first surface. The illustrative examples recognize and take into account that in large platforms such as an aircraft, a ship, or any other desirable platform having a support structure, the support structure is within the platform. The illustrative examples recognize and take into account that when the support structure is within a platform, the first surface of the composite skin is an inner surface and may be referred to as an inner mold line. The illustrative examples recognize and take into account that when the support structure is within a platform, the second surface of the composite skin is an outer surface and may be referred to as an outer mold line.

Referring now to the figures, and in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an environment in which a composite skin is present that was manufactured using a slip sheet having a compensation surface. For example, a composite skin of at least one of body 106, wing 102, or wing 104, may be manufactured using a slip sheet having a compensation surface.

This illustration of aircraft 100 is provided for the purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable types of structures.

Figure 2:
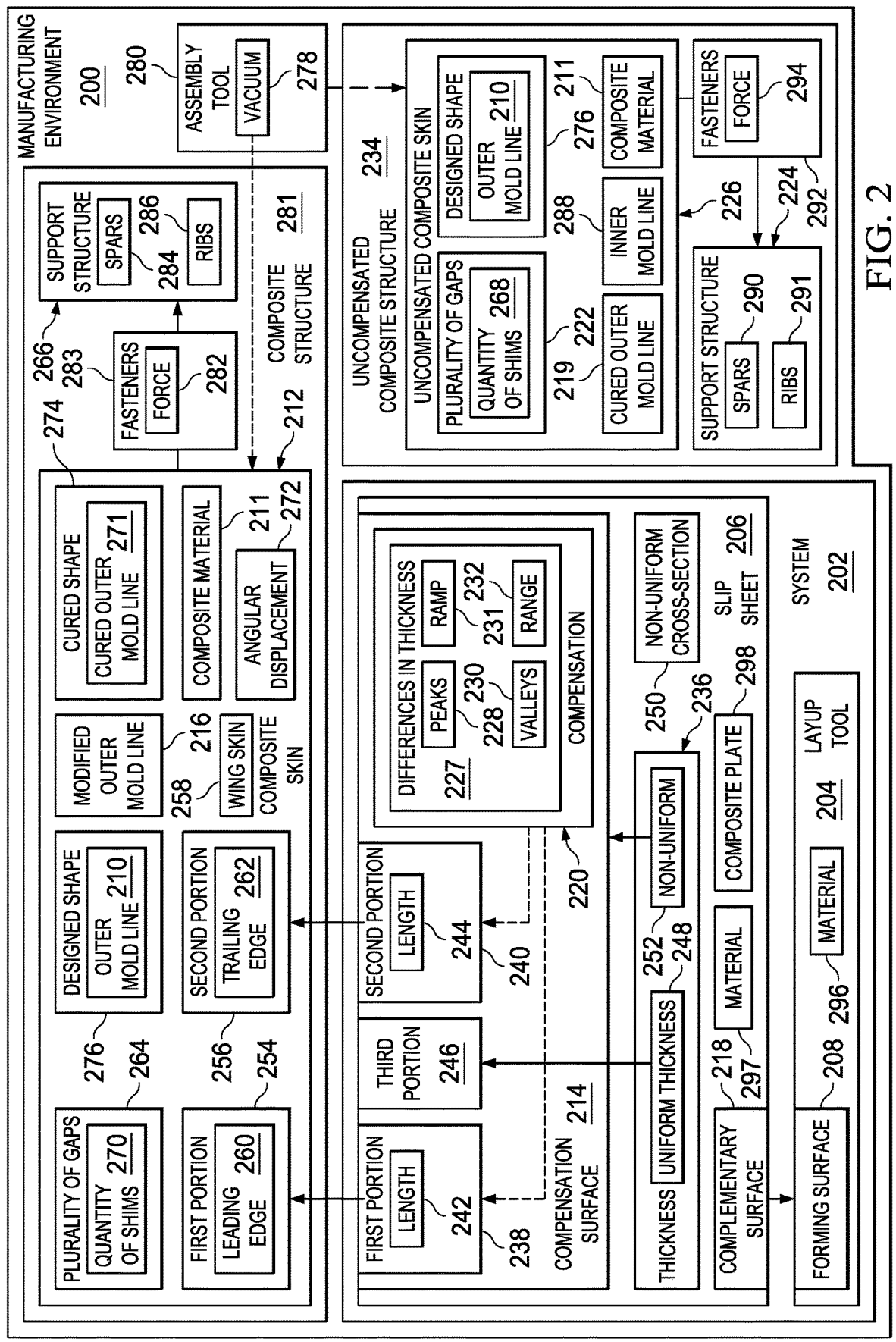
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is a depiction of an environment in which a composite skin is formed. In some illustrative examples, a composite wing skin of either wing 102 or wing 104 of aircraft 100 in FIG. 1, may be formed in manufacturing environment 200 of FIG. 2.

Manufacturing environment 200 of FIG. 2 includes system 202. System 202 comprises layup tool 204 and slip sheet 206. Layup tool 204 has forming surface 208 designed to form outer mold line 210 for composite material 211. Outer mold line 210 is a designed shape for an outer surface of composite skin 212. Slip sheet 206 has compensation surface 214 configured to provide modified outer mold line 216 for composite material 211 and complementary surface 218 configured to rest on forming surface 208. Compensation surface 214 differs from forming surface 208 due to differences in thickness 227 of slip sheet 206. Compensation surface 214 is opposite complementary surface 218.

Slip sheet 206 is configured to be secured to layup tool 204. Slip sheet 206 is configured to be secured to forming surface 208 of layup tool 204.

Outer mold line 210 is a desired shape for an outer surface of composite skin 212. Prior to curing, composite material 211 laid up on forming surface 208 has outer mold line 210.

Forming surface 208 is an unmodified mold surface for composite skins. Compensation surface 214 is configured to provide a modified mold surface for composite skins, such as composite skin 212. Compensation surface 214 differs from forming surface 208 due to compensation 220. The remainder of compensation surface 214 is the same as respective portions of forming surface 208.

Modified outer mold line 216 differs from outer mold line 210 to take into account deformation of composite material 211 during curing and cooling. Modified outer mold line 216 differs from outer mold line 210 because of compensation 220.

Prior to curing, composite material 211 laid up on forming surface 208 has outer mold line 210. Composite material 211 laid up on forming surface 208 is cured to form uncompensated composite skin 226. After curing, uncompensated composite skin 226 has cured outer mold line 219. Cured outer mold line 219 of uncompensated composite skin 226 differs from outer mold line 210. Deformation of composite material 211 following cure and cooling prevents uncompensated composite skin 226 from having outer mold line 210 after curing. Deformation of composite material 211 creates plurality of gaps 222 between support structure 224 and uncompensated composite skin 226 after assembly.

Compensation surface 214 is configured to provide compensation 220 for plurality of gaps 222 between support structure 224 and uncompensated composite skin 226. Uncompensated composite skin 226 comprises composite material 211 laid up on forming surface 208 and cured. Plurality of gaps 222 is created during assembly of uncompensated composite skin 226 with support structure 224. Plurality of gaps 222 are present between support structure 224 and uncompensated composite skin 226 due to cure related deformation of uncompensated composite skin 226.

Compensation surface 214 comprises differences in thickness 227 configured to provide compensation 220. In some illustrative examples, differences in thickness 227 include at least one of peaks 228 or valleys 230. Peaks 228 include independent areas of slip sheet 206 having a greater thickness than uniform thickness 248 of slip sheet 206. Valleys 230 include independent areas of slip sheet 206 having a lower thickness than uniform thickness 248 of slip sheet 206.

In some illustrative examples, uniform thickness 248 is selected taking into account at least one of cost of slip sheet 206, transportability of slip sheet 206, desired strength of slip sheet 206, desired values for differences in thickness 227, desired manufacturing time for composite skin 212, or other manufacturing characteristics. For example, uniform thickness 248 is large enough to accommodate differences in thickness 227. As another example, uniform thickness 248 is selected such that heating slip sheet 206 to a processing temperature for composite skin 212 does not add an undesirably large amount of time to manufacturing time. Increasing uniform thickness 248 increases the time to heat slip sheet 206 to an elevated temperature. In some illustrative examples, uniform thickness 248 is selected to reduce material cost. Increasing uniform thickness 248 increases the cost of slip sheet 206. In some illustrative examples, uniform thickness 818 is in the range of 0.25 inches to 0.50 inches.

In some illustrative examples, differences in thickness 227 include ramp 231. Ramp 231 is an area with graduated non-uniform 252 thickness. In some illustrative examples, ramp 231 increases thickness 236 from uniform thickness 248 of slip sheet 206. In some illustrative examples, ramp 231 decreases thickness 236 from uniform thickness 248 of slip sheet 206.

In some illustrative examples, differences in thickness 227 are in range 232 of 0.005 inches to 0.250 inches. In some illustrative examples, differences in thickness 227 are up to 0.050 inches. In some illustrative examples, differences in thickness 227 are in range 232 of 0.0050 inches to 0.050 inches. In some illustrative examples, differences in thickness 227 are in range 232 of 0.050 inches to 0.150 inches.

In some illustrative examples, range 232 is configured such that compensation 220 is sufficient to remove at least half of plurality of gaps 222. In some illustrative examples, range 232 is configured such that compensation 220 is sufficient to remove the gaps of plurality of gaps 222 in desirable regions of uncompensated composite skin 226. For example, in some illustrative examples, when uncompensated composite structure 234 is a wing of an aircraft, range 232 is configured such that compensation 220 is sufficient to remove the gaps of plurality of gaps 222 that are on a leading edge and a trailing edge of uncompensated composite skin 226.

In some illustrative examples, compensation 220 may include an overall thickness reduction. For example, compensation 220 may include a reduction in thickness 236 of slip sheet 206 moving from the center of slip sheet 206 towards at least one of first portion 238 or second portion 240.

In some illustrative examples, first portion 238 has length 242. In some illustrative examples, thickness 236 of slip sheet 206 is reduced across length 242. In some illustrative examples, thickness 236 of slip sheet 206 is reduced across length 242 by about 0.050 inches.

In some illustrative examples, second portion 240 has length 244. In some illustrative examples, thickness 236 of slip sheet 206 is reduced across length 244. In some illustrative examples, thickness 236 of slip sheet 206 is reduced across length 244 by about 0.050 inches. In these illustrative examples, length 244 may be ramp 231.

In some illustrative examples, differences in thickness 227 are present in first portion 238 and second portion 240 of compensation surface 214. In some illustrative examples, first portion 238 and second portion 240 are separated by third portion 246 of compensation surface 214. In these illustrative examples, third portion 246 has uniform thickness 248.

In some illustrative examples, third portion 246 is the same as a respective portion of forming surface 208 of layup tool 204. In these illustrative examples, first portion 238 and second portion 240 are different from corresponding portions of forming surface 208 of layup tool 204.

Due to compensation surface 214, slip sheet 206 has non-uniform cross-section 250. Due to compensation 220, thickness 236 in first portion 238 and second portion 240 is non-uniform 252.

First portion 254 of composite skin 212 is composite material 211 laid up on first portion 238 of slip sheet 206. Second portion 256 of composite skin 212 is composite material 211 laid up on second portion 240 of slip sheet 206. In some illustrative examples, when composite skin 212 is wing skin 258, first portion 254 takes the form of leading edge 260. In some illustrative examples, when composite skin 212 is wing skin 258, second portion 256 takes the form of trailing edge 262.

In some illustrative examples, compensation surface 214 is configured to reduce gaps for leading edge 260 and trailing edge 262. In these illustrative examples, first portion 238 and second portion 240 are positioned at the edges of slip sheet 206.

Plurality of gaps 264 between support structure 266 and composite skin 212 formed on slip sheet 206 has a lower quantity of gaps than plurality of gaps 222 between support structure 224 and uncompensated composite skin 226 formed on forming surface 208 of layup tool 204. Compensation surface 214 is configured to reduce quantity of shims 268 providing compensation for plurality of gaps 222 between support structure 224 and uncompensated composite skin 226. Compensation surface 214 is configured such that quantity of shims 270 for plurality of gaps 264 of composite skin 212 has fewer shims that quantity of shims 268 for plurality of gaps 222 of uncompensated composite skin 226.

Prior to curing, composite material 211 laid up on compensation surface 214 has modified outer mold line 216. Composite material 211 laid up on compensation surface 214 is cured to form composite skin 212.

After curing, composite skin 212 has cured outer mold line 271. Cured outer mold line 271 of composite skin 212 differs from modified outer mold line 216. Deformation of composite material 211 following cure and cooling prevents composite skin 212 from having modified outer mold line 216 after curing.

Modified outer mold line 216 is configured to adjust angular displacement 272 of composite skin 212. Composite skin 212 is composite material 211 laid up on compensation surface 214 and cured. Angular displacement 272 results from chemical and mechanical factors such as thermal expansion and chemical shrinkage during curing and cooling. Due to angular displacement 272, cured outer mold line 219 is different from outer mold line 210 of designed shape 276. Due to angular displacement 272, cured shape 274 is different from designed shape 276 including outer mold line 210. Due to angular displacement 272, cured outer mold line 271 of cured shape 274 is also different from modified outer mold line 216. In composite skin 212, the difference between cured shape 274 and designed shape 276 is modified by vacuum 278 applied by assembly tool 280.

Following curing, composite skin 212 is held on assembly tool 280 using vacuum 278. Assembly tool 280 applies an allowable force to composite skin 212 using vacuum 278. Composite skin 212 is connected to support structure 266 while composite skin 212 is held on assembly tool 280. Composite skin 212 is connected to support structure 266 to form composite structure 281. After releasing vacuum 278 on composite skin 212, force 282 is transferred to fasteners 283 and support structure 266, including spars 284 and ribs 286. Vacuum 278 applies an allowable load such that force 282 on fasteners 283 is an acceptable value.

Following curing, uncompensated composite skin 226 is held on assembly tool 280 using vacuum 278. Assembly tool 280 applies an allowable force to uncompensated composite skin 226 using vacuum 278. Uncompensated composite skin 226 is connected to support structure 224 while uncompensated composite skin 226 is held on assembly tool 280. After releasing vacuum 278 on uncompensated composite skin 226, plurality of gaps 222 are present between uncompensated composite skin 226 and support structure 224. Quantity of shims 268 are positioned within plurality of gaps 222 created during assembly of uncompensated composite structure 234. Compensation surface 214 is configured such that quantity of shims 270 for plurality of gaps 264 of composite skin 212 has fewer shims that quantity of shims 268 for plurality of gaps 222 of uncompensated composite skin 226.

In some illustrative examples, compensation surface 214 is configured to eliminate gaps of up to 0.10 inches between first portion 254 of composite skin 212 and support structure 266 during assembly. In some illustrative examples, the gaps are eliminated after applying up to a maximum allowable force to first portion 254 of composite skin 212. In these illustrative examples, the force, up to the maximum allowable force, is provided by vacuum 278 of assembly tool 280.

To design slip sheet 206, plurality of gaps 222 of uncompensated composite structure 234 are determined. To design slip sheet 206, composite material 211 may be physically laid up on forming surface 208 of layup tool 204 and cured to form uncompensated composite skin 226. In other illustrative examples, manufacturing steps such as laying up composite material 211 and curing to form uncompensated composite skin 226 are performed in a simulation. After laying up composite material 211 on forming surface 208, composite material 211 is cured to form uncompensated composite skin 226. Up to a maximum allowable force is applied to uncompensated composite skin 226 by assembly tool 280 after curing. The maximum allowable force is applied by vacuum 278.

Inner mold line 288 of uncompensated composite skin 226 is measured while uncompensated composite skin 226 is held by assembly tool 280. Inner mold line 288 is the surface of uncompensated composite skin 226 to contact support structure 224. Differences in thickness 227 of compensation surface 214 are designed based on a difference between inner mold line 288 of uncompensated composite skin 226 and designed shape 276. More specifically, differences in thickness 227 of compensation surface 214 may be designed based on a difference between inner mold line 288 of uncompensated composite skin 226 and an inner mold line of designed shape 276. Designing differences in thickness 227 of compensation surface 214 takes into account resin characterization and thermodynamics for curing and cooling of composite material 211.

In uncompensated composite structure 234, plurality of gaps 222 are present between uncompensated composite skin 226 and support structure 224. Support structure 224 comprises spars 290 and ribs 291. Fasteners 292 connect uncompensated composite skin 226 to support structure 224. Plurality of gaps 222 exist when fasteners 292 have force 294. Force 294 is an allowable force. An allowable value for force 294 takes into account at least one of material, design, manufacturing tolerances, or other desirable characteristics of at least one of spars 290, ribs 291, or uncompensated composite skin 226.

Manufacturing slip sheet 206 takes less time than manufacturing layup tool 204. In some illustrative examples, layup tool 204 may be precision milled from material 296. Material 296 may take any desirable form. In some illustrative examples, material 296 is a metal.

Slip sheet 206 may be formed of any desirable material. In some illustrative examples, material 297 is selected based on any desirable material properties, such as strength, rigidity, reactivity, maximum allowable temperature, or any other desirable material properties. In some illustrative examples, material 297 of slip sheet 206 is a metal. When material 297 is a metal, slip sheet 206 may be formed using any desirable manufacturing processes such as machining, milling, or other desirable processes.

In some illustrative examples, material 297 of slip sheet 206 is a composite material. In some illustrative examples, slip sheet 206 may be manufactured by laying down and curing a composite material, material 297, to form slip sheet 206 having compensation surface 214. In some illustrative examples, slip sheet 206 may be manufactured by laying down, curing, and milling a composite material, material 297, to form slip sheet 206 having compensation surface 214.

In some illustrative examples in which material 297 is a composite material, composite plate 298 with complementary surface 218 is created. Complementary surface 218 is complementary to forming surface 208 of layup tool 204. Differences in thickness 227 are formed into the composite plate to form compensation surface 214 of slip sheet 206 opposite complementary surface 218.

Composite plate 298 is formed by laying down composite material. In some illustrative examples, differences in thickness 227 are formed into composite plate 298 as composite plate 298 is created. In these illustrative examples, differences in thickness 227 are formed prior to curing composite plate 298. For example, laying up a composite material to form composite plate 298 also forms differences in thickness 227. After laying down the composite material to form composite plate 298, composite plate 298 is cured to form slip sheet 206.

In other illustrative examples, composite plate 298 is cured prior to forming differences in thickness 227. In these illustrative examples, differences in thickness 227 are milled or otherwise formed into a surface of composite plate 298 after curing.

Slip sheet 206 locally compensates for cure related deformation in composite skin 212. Cure related deformation in composite skin 212 is compensated for by laying up composite material 211 on compensation surface 214 of slip sheet 206 designed to form a modified outer mold line 216 different from designed shape 276, wherein the slip sheet 206 is held against forming surface 208 of layup tool 204, wherein forming surface 208 is designed to form outer mold line 210 of designed shape 276.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, compensation surface 214 may include any desirable quantity of portions. In some illustrative examples, second portion 240 having length 244 may not be present. In other illustrative examples, a fourth portion of compensation surface 214 may be present. The types of differences in thickness 227 may be different in the fourth portion than other portions of first portion 238 or second portion 240.

As another example, compensation surface 214 may not be divided into portions. In this example, compensation surface 214 may have differences in thickness 227 as desired across the whole of compensation surface 214.

As another example, at least one of first portion 254 or second portion 256 may not be present in composite skin 212. For example, the whole of compensation surface 214 may have differences in thickness 227 as desired and composite skin 212 may be compensated throughout.

Figure 3:
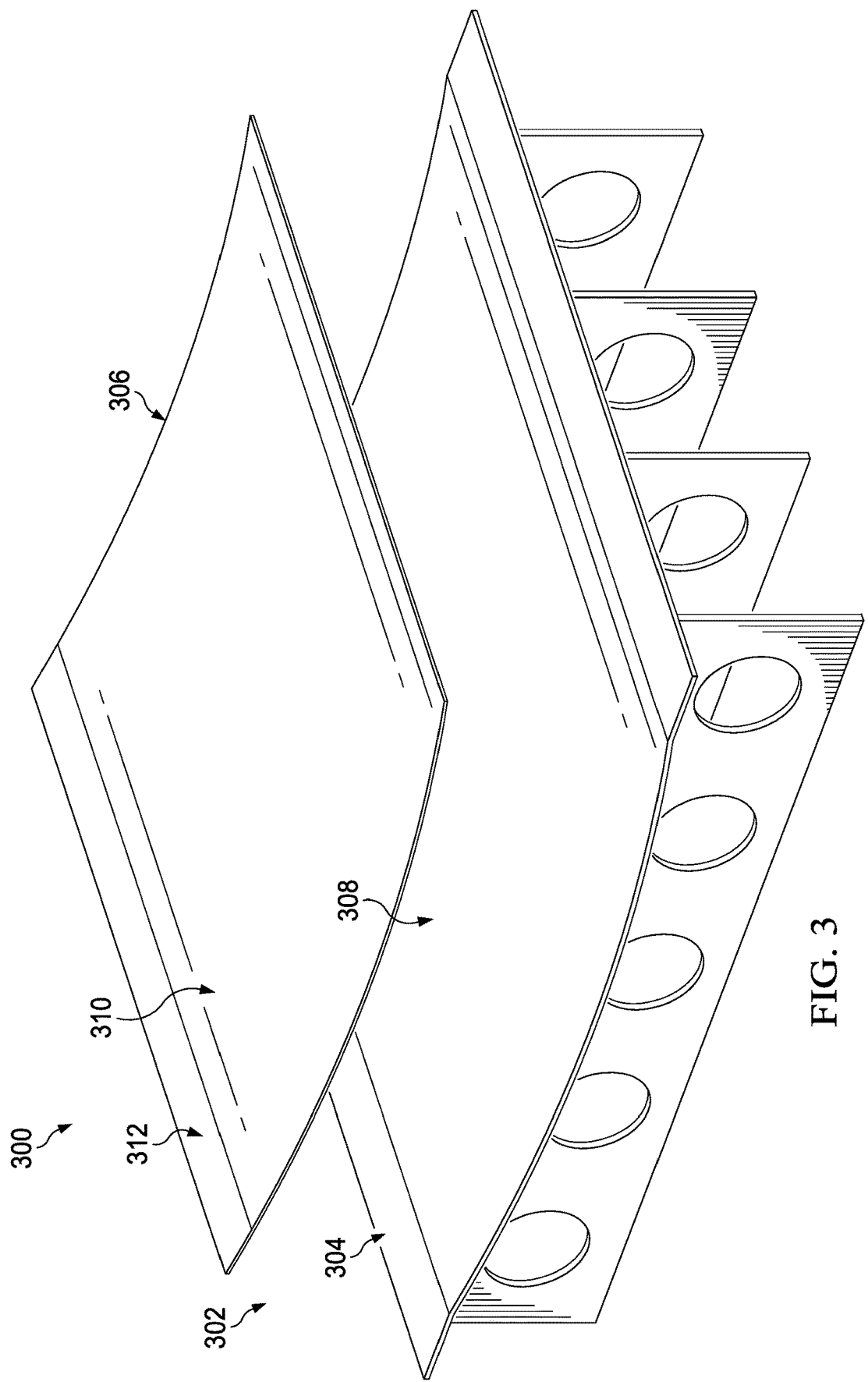
FIG. 3 is an illustration of an exploded view of a slip sheet and a layup tool in accordance with an illustrative embodiment.

Turning now to FIG. 3, an illustration of an exploded view of a slip sheet and a layup tool is depicted in accordance with an illustrative embodiment. Manufacturing environment 300 is a physical implementation of manufacturing environment 200 of FIG. 2. Manufacturing environment 300 includes system 302. System 302 is a physical implementation of system 202 of FIG. 2.

System 302 comprises layup tool 304 and slip sheet 306. Layup tool 304 has forming surface 308 to form an outer mold line for a composite material. Slip sheet 306 is configured to be secured to forming surface 308. Slip sheet 306 is configured to provide compensation for a plurality of gaps between a support structure and an uncompensated composite skin, wherein the uncompensated composite skin comprises composite material laid up on forming surface 308 and cured.

Forming surface 308 is an unmodified mold surface for composite skins. Compensation surface 310 is configured to provide a modified mold surface for composite skins.

An uncompensated composite skin (not depicted) formed from curing a composite material laid up on forming surface 308 may use thousands of shims to fill a plurality of gaps between the uncompensated composite skin (not depicted) and a support structure (not depicted). Installing the thousands of shims adds to the manufacturing time and manufacturing costs of a composite structure.

In some illustrative examples, forming surface 308 is designed based on a designed shape for the composite skin (not depicted). Due to expansion and contraction of the resin during curing and cooling of the composite skin, a cured shape for the uncompensated composite skin (not depicted) is not the same as the outer mold line created by forming surface 308. The cured shape of the uncompensated composite skin is not the same as the designed shape.

Creating a new layup tool may be undesirably costly. Creating layup tool 304 may cost millions of dollars. Further, designing, qualifying, and manufacturing a new layup tool may take multiple years.

Slip sheet 306 has compensation surface 310 configured to provide a modified outer mold line for the composite material. Compensation surface 310 differs from forming surface 308 due to differences in thickness of slip sheet 306. Compensation surface 310 has compensation 312. Compensation 312 is located on slip sheet 306 to reduce a quantity of gaps that are present when an allowed force is applied to a composite skin formed from a composite material laid up on slip sheet 306.

In some illustrative examples, compensation 312 has a range of 0.005 inches to 0.250 inches. In some illustrative examples, compensation 312 is up to 0.050 inches. In some illustrative examples, compensation 312 has a range of 0.0050 inches to 0.050 inches. In some illustrative examples, compensation 312 has a range of 0.050 inches to 0.150 inches.

Figure 4:
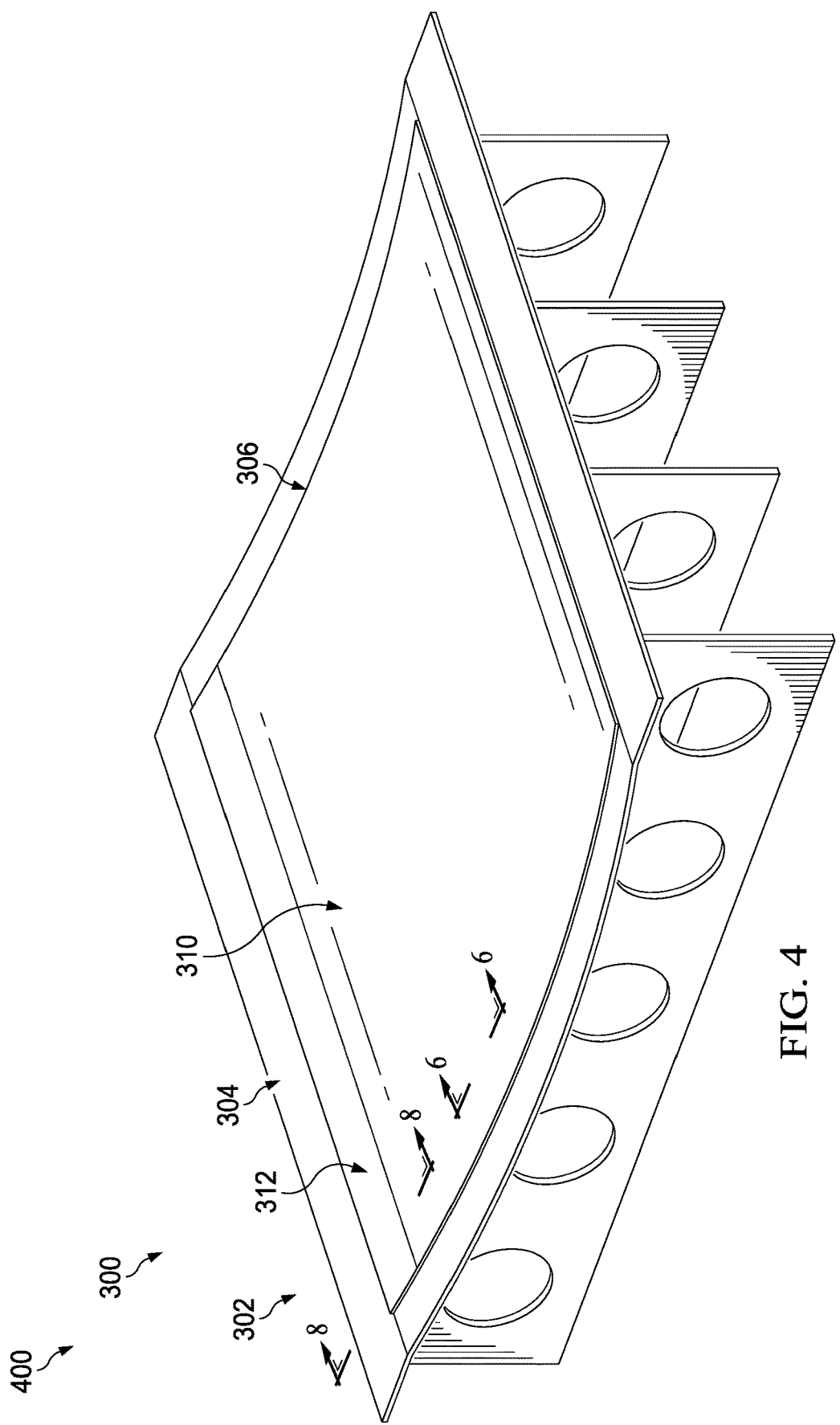
FIG. 4 is an illustration of a perspective view of a slip sheet secured to a layup tool in accordance with an illustrative embodiment.

Turning now to FIG. 4, an illustration of a perspective view of a slip sheet secured to a layup tool is depicted in accordance with an illustrative embodiment. In view 400 of manufacturing environment 300, slip sheet 306 has been secured to layup tool 304. Slip sheet 306 is secured to layup tool 304 using any desirable fasteners. In one illustrative example, slip sheet 306 is bolted to forming surface 308 shown in FIG. 3. In some illustrative examples, slip sheet 306 is sealed to layup tool 304 such that undesirable debris is not introduced between forming surface 308 and slip sheet 306.

As depicted, slip sheet 306 completely covers forming surface 308. To layup a composite skin, composite material is laid up on compensation surface 310.

Figure 5:
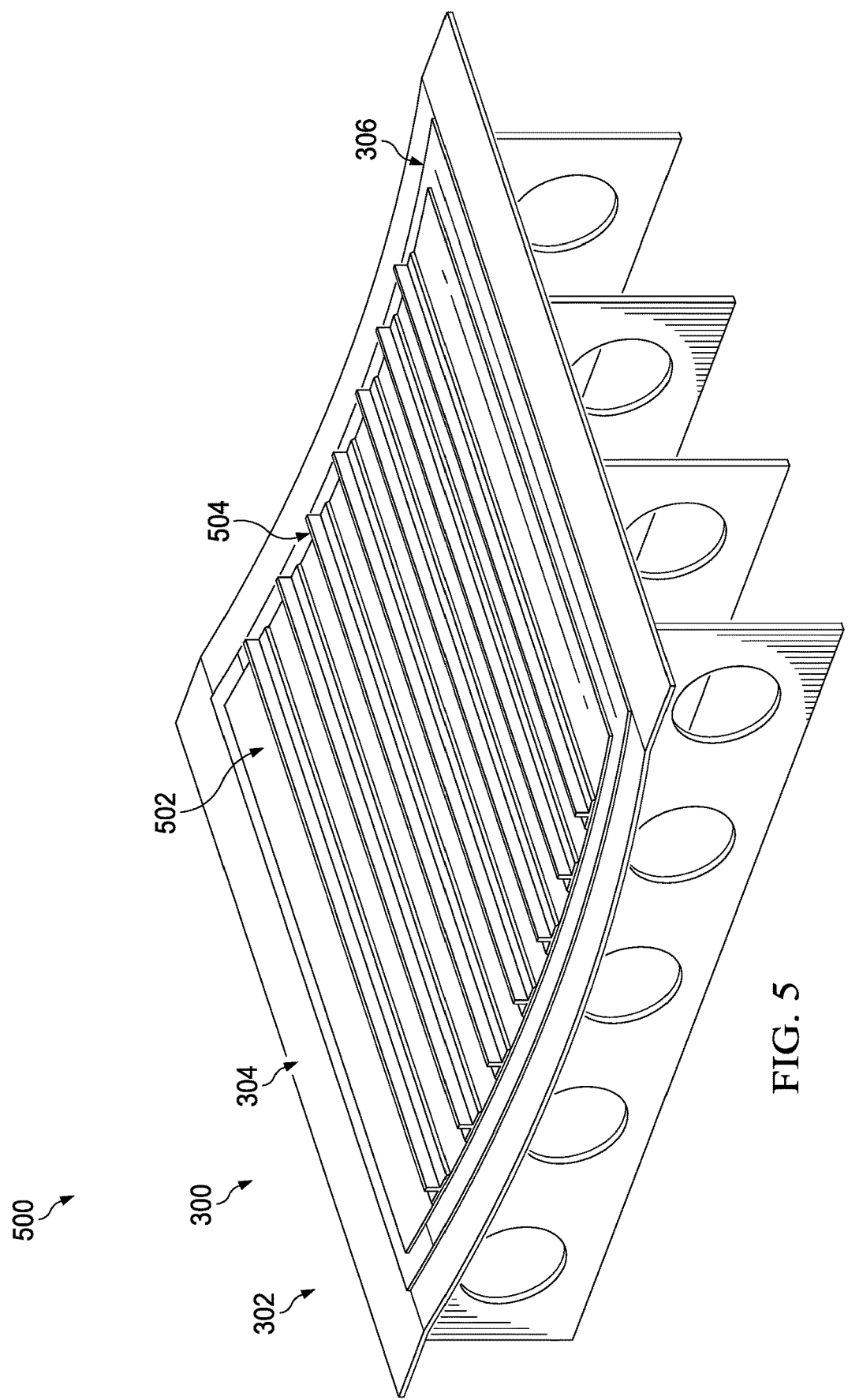
FIG. 5 is an illustration of a perspective view of a composite material on a slip sheet secured to a layup tool in accordance with an illustrative embodiment.

Turning now to FIG. 5, an illustration of a perspective view of a composite material on a slip sheet secured to a layup tool is depicted in accordance with an illustrative embodiment. In view 500 of manufacturing environment 300, composite material 502 has been laid up on compensation surface 310, shown in FIG. 3, of slip sheet 306. Composite material 502 will be cured to form a composite skin. The composite skin will have a different cured shape than an uncompensated composite skin formed from composite material laid up on forming surface 308 of layup tool 304.

As depicted, composite stiffeners 504 are positioned on composite material 502 prior to curing composite material 502. In this illustrative example, composite stiffeners 504 and composite material 502 are co-cured to bond composite stiffeners 504 to composite material 502 while curing composite material 502.

Although composite stiffeners 504 are depicted, in some illustrative examples, composite stiffeners 504 may not be present prior to curing. In some illustrative examples, composite material 502 may be cured without composite stiffeners 504. Composite material 502 may have any desirable size, shape, or thickness. Depiction of composite material 502 in FIG. 5 is only one non-limiting depiction of a physical implementation of composite material 211 of FIG. 2.

Figure 6:
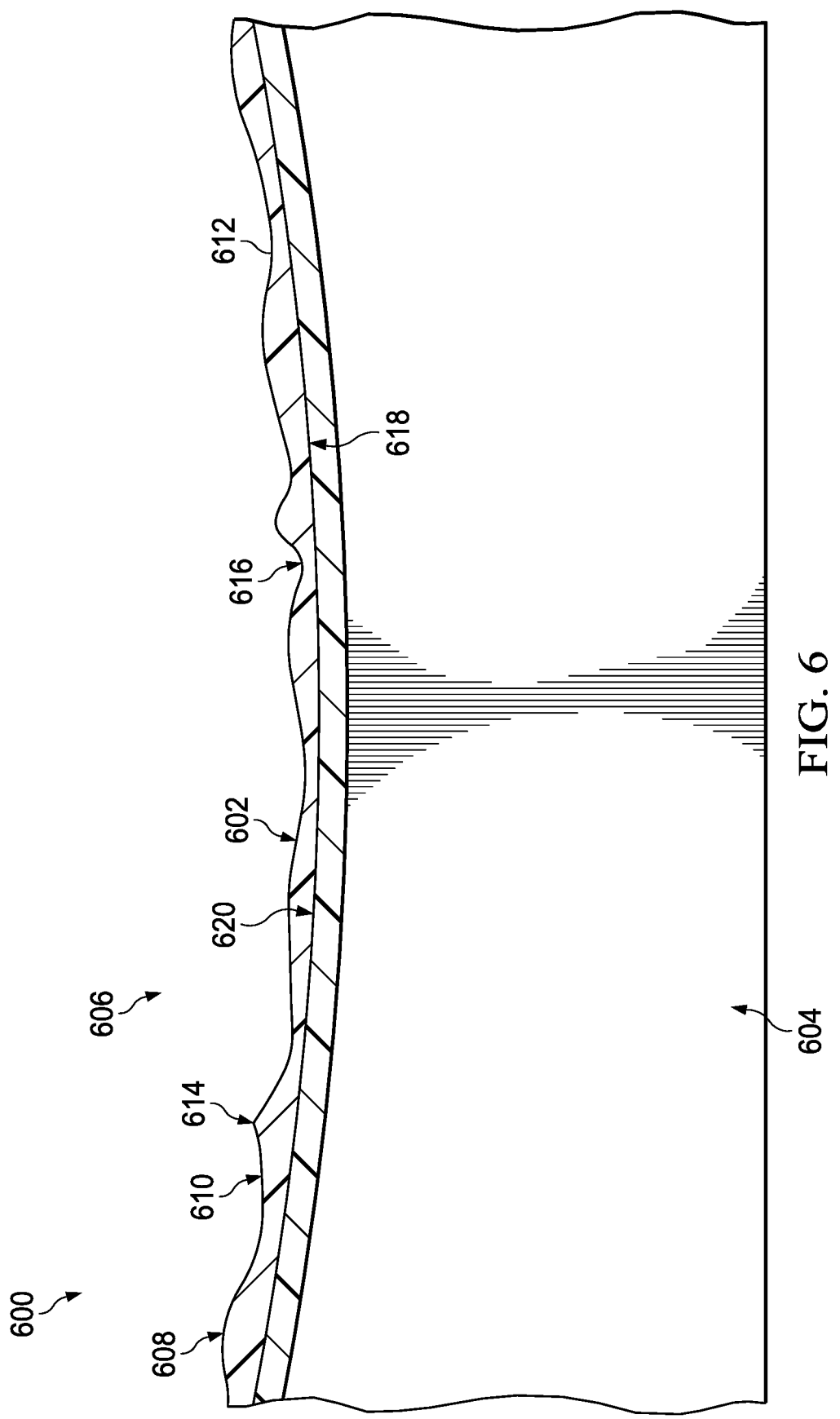
FIG. 6 is an illustration of a cross-sectional view of a slip sheet secured to a layup tool in accordance with an illustrative embodiment.

Turning now to FIG. 6, an illustration of a cross-sectional view of a slip sheet secured to a layup tool is depicted in accordance with an illustrative embodiment. View 600 is a cross-sectional view of slip sheet 602 on layup tool 604. View 600 may be along any point on slip sheet 602.

Slip sheet 602 is a physical implementation of slip sheet 206 of FIG. 2. In some illustrative examples, view 600 of slip sheet 602 is a view of slip sheet 306 in FIGS. 3-5 above. For example, view 600 may be a view within the box labeled as FIG. 6 and along the line labeled 6-6. In other illustrative examples, slip sheet 602 is a physical implementation of a slip sheet other than slip sheet 306.

In view 600 of system 606, compensation 608 formed by differences in thickness 610 is visible. In some illustrative examples, differences in thickness 610 are only within designated portions of slip sheet 602. For example, view 600 may be taken within a portion designated to have differences in thickness 610, such as first portion 238 or second portion 240 of FIG. 2. In this example, at least one portion of slip sheet 602 outside of view 600 would have a uniform thickness. In another example, all of compensation surface 612 of slip sheet 602 may have differences in thickness 610.

In some illustrative examples, differences in thickness 610 are in a range of 0.005 inches to 0.250 inches. In some illustrative examples, differences in thickness 610 are up to 0.050 inches. In some illustrative examples, differences in thickness 610 are in a range of 0.0050 inches to 0.050 inches. In some illustrative examples, differences in thickness 610 are in a range of 0.050 inches to 0.150 inches.

As depicted, compensation surface 612 comprises differences in thickness 610, including peaks 614 and valleys 616, configured to provide compensation 608. Peaks 614 and valleys 616 may have any desirable height. In some illustrative examples, peaks 614 and valleys 616 may have a height up to 0.25 inches.

As depicted, complementary surface 618 of slip sheet 602 contacts forming surface 620 of layup tool 604. As depicted, differences in thickness 610 comprise a difference between forming surface 620 and compensation surface 612.

Figure 7:
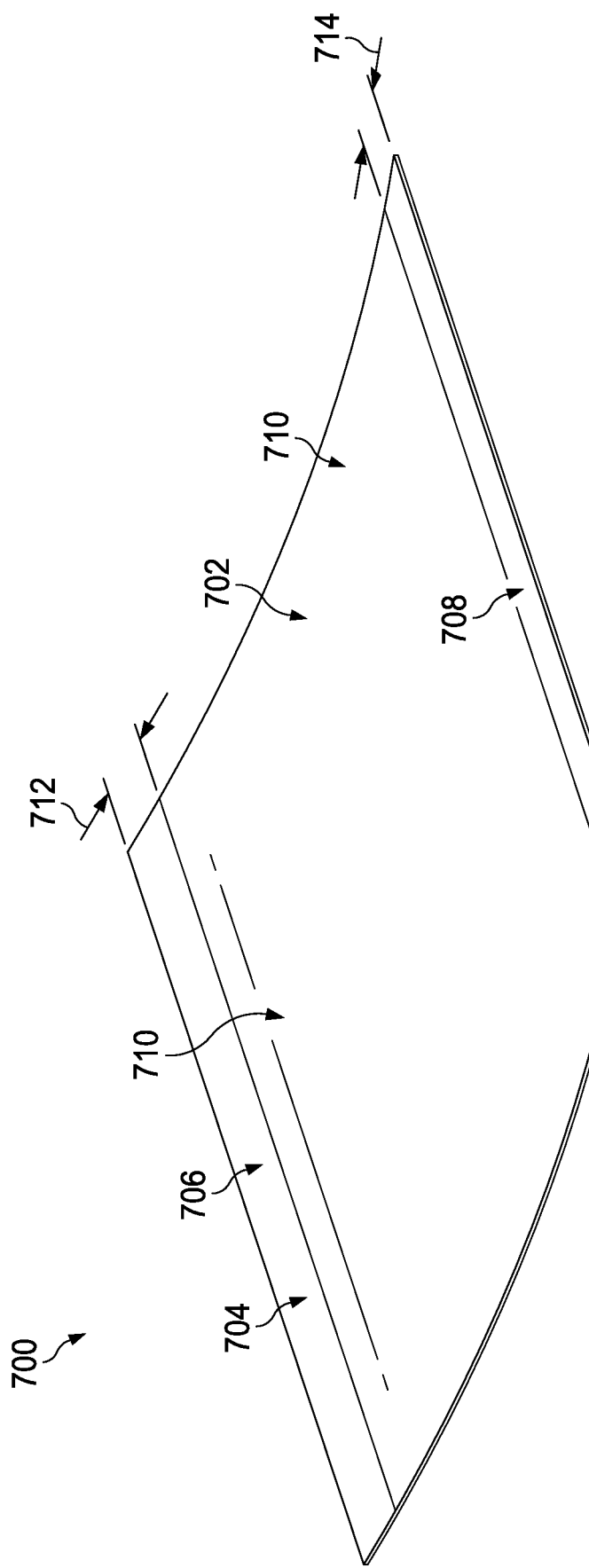
FIG. 7 is an illustration of an isometric view of a slip sheet in accordance with an illustrative embodiment.

Turning now to FIG. 7, an illustration of an isometric view of a slip sheet is depicted in accordance with an illustrative embodiment. Slip sheet 700 is a physical implementation of slip sheet 206 of FIG. 2. Slip sheet 700 may be used within manufacturing environment 300 of FIG. 3.

Slip sheet 700 has compensation surface 702. Compensation surface 702 is configured to provide a modified mold surface for composite skins. Compensation surface 702 is configured to provide a modified outer mold line for a composite material.

Compensation surface 702 comprises differences in thickness configured to provide compensation 704. In some illustrative examples, differences in thickness are in a range of 0.005 inches to 0.250 inches. In some illustrative examples, differences in thickness are up to 0.050 inches. In some illustrative examples, differences in thickness are in a range of 0.0050 inches to 0.050 inches. In some illustrative examples, differences in thickness are in a range of 0.050 inches to 0.150 inches.

In this illustrative example, compensation 704 created by the differences in thickness is present in first portion 706 and second portion 708 of compensation surface 702. First portion 706 and second portion 708 are separated by third portion 710 of compensation surface 702. In some illustrative examples, third portion 710 has a uniform thickness.

First portion 706 has width 712. Second portion 706 has width 714.

Slip sheet 700 is only one non-limiting example of a physical implementation of slip sheet 206. In some illustrative examples, second portion 708 may not be present. In other illustrative examples, differences in thickness may not be limited to specified portions. In some illustrative examples, all of compensation surface 702 has differences in thickness as desired. In yet other illustrative examples, at least one of first portion 706 or second portion 708 have a different shape or size. In some illustrative examples, other non-depicted portions of compensation surface 702 may be present.

Figure 8:
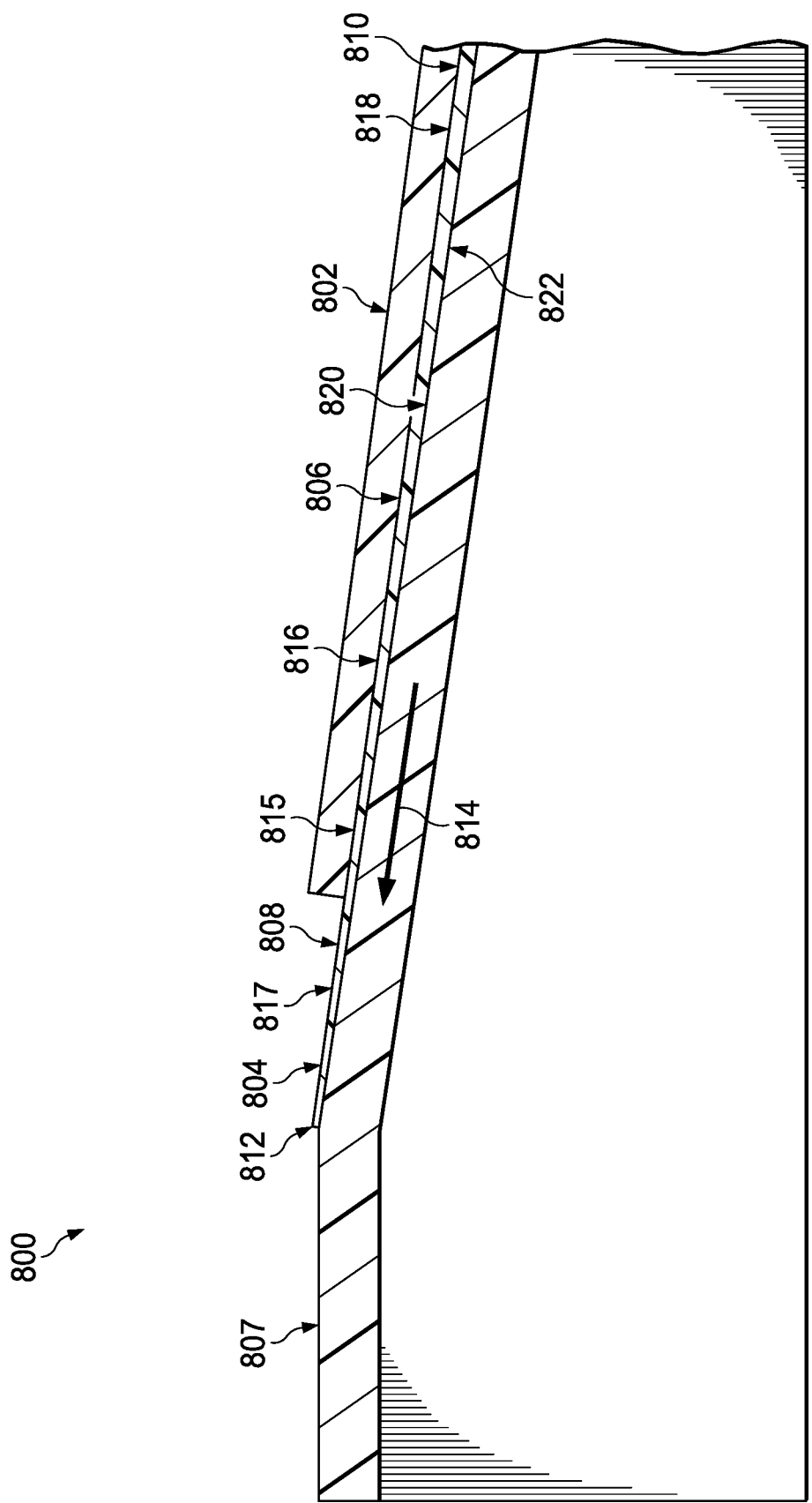
FIG. 8 is an illustration of a cross-sectional view of a composite skin on a slip sheet secured to a layup tool in accordance with an illustrative embodiment.

Turning now to FIG. 8, an illustration of a cross-sectional view of a composite skin on a slip sheet secured to a layup tool is depicted in accordance with an illustrative embodiment. View 800 is a cross-sectional view of composite material 802 laid up on compensation surface 804 of slip sheet 806 on top of layup tool 807. View 800 is along edge 812 of slip sheet 806.

Slip sheet 806 is a physical implementation of slip sheet 206 of FIG. 2. In some illustrative examples, view 800 is a cross-sectional view of manufacturing environment 300 with composite material 502 laid up on compensation surface 310, shown in FIG. 3, of slip sheet 306. For example, view 800 may be a view within the box labeled as FIG. 8 and along the line labeled 8-8. In other illustrative examples, slip sheet 806 is a physical implementation of a slip sheet other than slip sheet 306.

In some illustrative examples, slip sheet 806 may be the same as slip sheet 700 of FIG. 7. For example, view 800 of slip sheet 806 with first portion 808 and third portion 810 may be a view of first portion 706 and a part of third portion 710 of slip sheet 700 of FIG. 7. In other illustrative examples, slip sheet 806 may be a slip sheet different from slip sheet 700 of FIG. 7.

Compensation surface 804 is configured to provide a modified mold surface for forming composite skins. Compensation surface 804 is configured to provide a modified outer mold line for composite material 802.

As depicted, slip sheet 806 has first portion 808 and third portion 810. First portion 808 decreases in thickness moving from third portion 810 towards edge 812 of slip sheet 806. As depicted, first portion 808 gradually reduces thickness moving in direction 814. In view 800, compensation 815 formed by differences in thickness 816 is visible. In this illustrative example, differences in thickness 816 take the form of ramp 817.

Third portion 810 has uniform thickness 818. In some illustrative examples, uniform thickness 818 is configured such that third portion 810 of slip sheet 206 is substantially the same as a portion of forming surface 820 of layup tool 807. In some illustrative examples, uniform thickness 818 is in the range of 0.25 inches to 0.50 inches. In some illustrative examples, uniform thickness 818 is about one quarter inch. In some illustrative examples, first portion 808 decreases in thickness from about one quarter inch to about one tenth of an inch.

As depicted, complementary surface 822 of slip sheet 806 contacts forming surface 820 of layup tool 807. As depicted, differences in thickness 816 comprise a difference between forming surface 820 and compensation surface 804.

Figure 9:
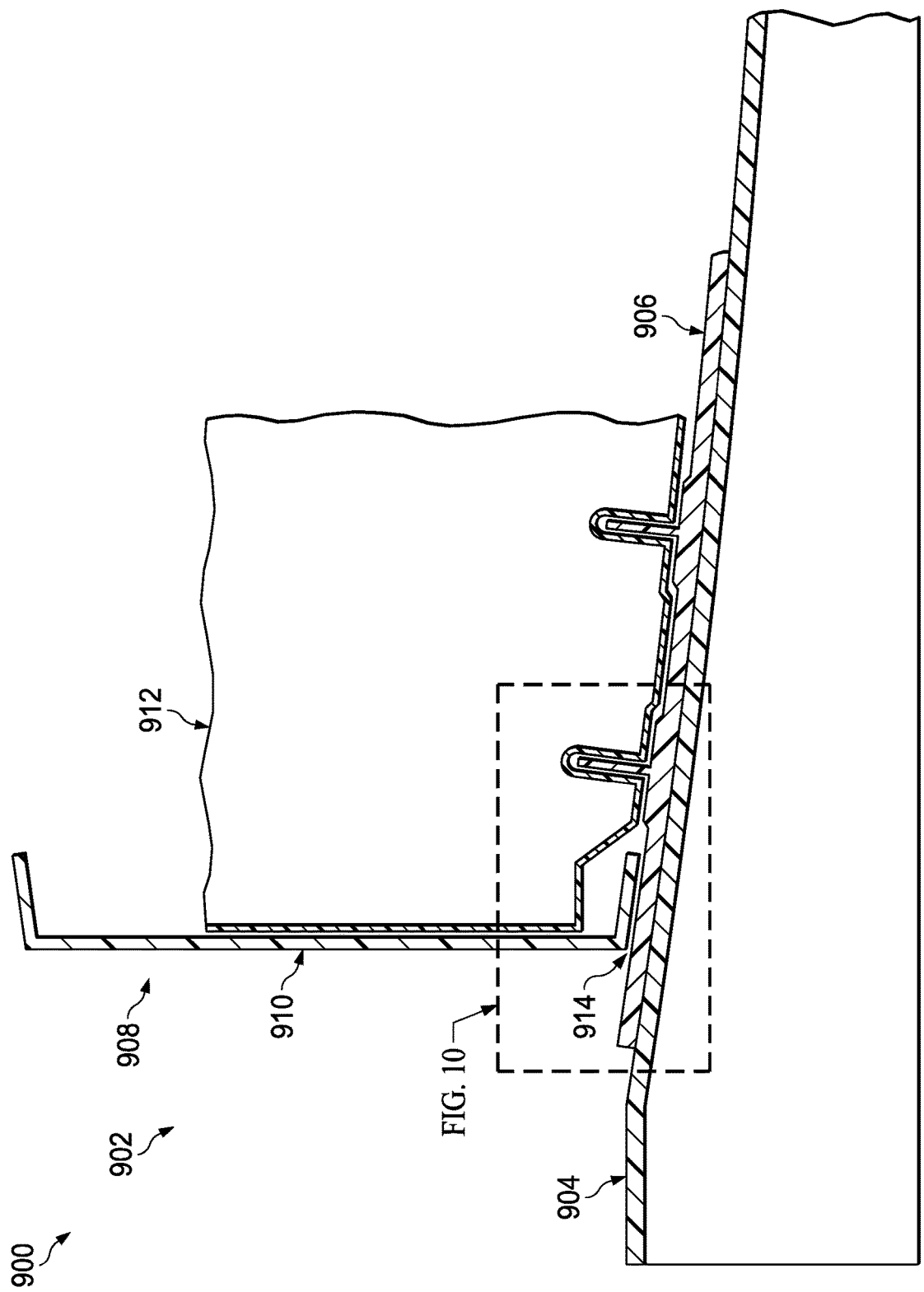
FIG. 9 is an illustration of a cross-sectional view of an uncompensated composite structure on an assembly tool in accordance with an illustrative embodiment.

Turning now to FIG. 9, an illustration of a cross-sectional view of an uncompensated composite structure on an assembly tool is depicted in accordance with an illustrative embodiment. View 900 is a cross-sectional view of uncompensated composite structure 902 on assembly tool 904. Uncompensated composite structure 902 is a physical implementation of uncompensated composite structure 234 of FIG. 2. Assembly tool 904 is a physical implementation of assembly tool 280 of FIG. 2.

Uncompensated composite structure 902 includes uncompensated composite skin 906 and support structure 908. Support structure 908 includes spar 910 and rib 912. Uncompensated composite skin 906 is a physical implementation of uncompensated composite skin 226 of FIG. 2. Uncompensated composite skin 906 is formed from composite material laid up on a forming surface of a layup tool, such as forming surface 208 of layup tool 204 of FIG. 2.

As depicted, view 900 is a cutaway view. Each of uncompensated composite skin 906, support structure 908, and assembly tool 904 have illustrative cutaway edges. Each of uncompensated composite skin 906, support structure 908, and assembly tool 904 may extend further than depicted.

After laying up and curing a composite material to form uncompensated composite skin 906, uncompensated composite skin 906 is secured on assembly tool 904. Assembly tool 904 applies a vacuum to hold uncompensated composite skin 906. Assembly tool 904 applies an allowable force to uncompensated composite skin 906 using the vacuum. Assembly tool 904 applies up to a maximum allowable force.

Uncompensated composite skin 906 is connected to support structure 908 while uncompensated composite skin 906 is held on assembly tool 904. After releasing the vacuum on uncompensated composite skin 906, a load is transferred to the fasteners and support structure 908.

In view 900, gap 914 is present between uncompensated composite skin 906 and spar 910. Gap 914 is created due to an angular deformation of uncompensated composite skin 906 during and after curing. Gap 914 is present when a maximum allowable pull up force is applied to the fasteners (not depicted) and rib 912 of uncompensated composite structure 902.

Gap 914 is a physical implementation of one of plurality of gaps 222 of FIG. 2. Gap 914 is created during assembly as uncompensated composite skin 906 is connected to support structure 908.

Assembly tool 904 is a non-limiting depiction of an assembly system. View 900 is a cross-sectional view through a portion of assembly tool 904. View 900 does not display the entirety of assembly tool 904. View 900 displays only a single surface of assembly tool 904 contacting uncompensated composite skin 906. Although not visible in view 900, assembly tool 904 may include any desirable number of surfaces with any desirable sizes and any desirable shapes. A physical implementation of assembly tool 280 of FIG. 2 will be designed taking into account designed shape 276 of composite skin 212.

In some illustrative examples, only portions of uncompensated composite skin 906 contact assembly tool 904. In some illustrative examples, only a periphery of uncompensated composite skin 906 contacts assembly tool 904. In other illustrative examples, In some illustrative examples, assembly tool 904 may include a plurality of components each separated from the others and each providing a respective surface contacting uncompensated composite skin 906. In some illustrative examples, the plurality of components may be separated moving into or out of the page. In some illustrative examples, additional assembly tools (not depicted) may hold support structure 908 during assembly.

Figure 10:
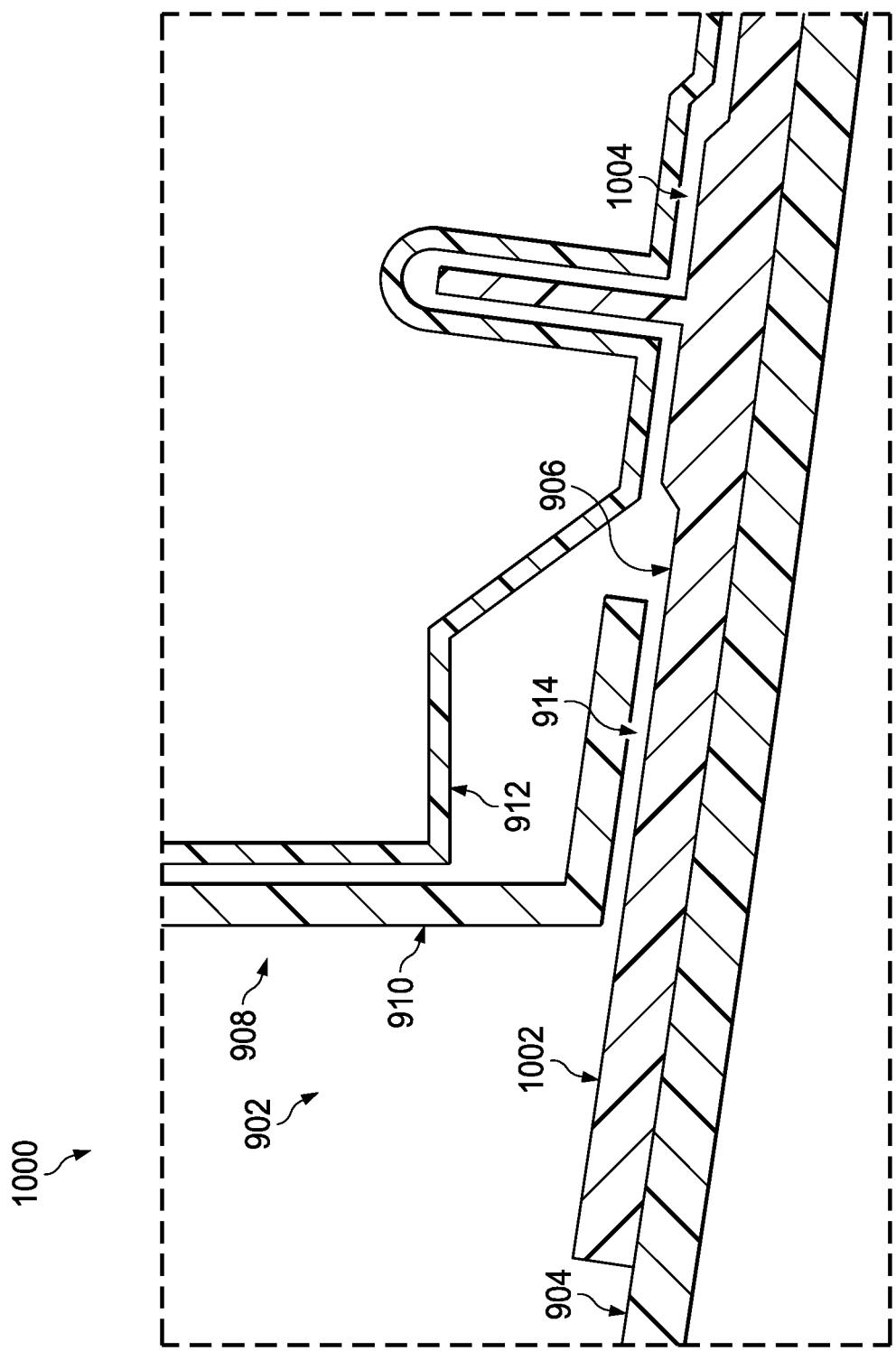
FIG. 10 is an illustration of a cross-sectional view of an uncompensated composite structure on an assembly tool in accordance with an illustrative embodiment.

Turning now to FIG. 10, an illustration of a cross-sectional view of an uncompensated composite structure on an assembly tool is depicted in accordance with an illustrative embodiment. View 1000 is a view within box 10 of FIG. 9.

Gap 914 is more clearly seen in view 1000. It is undesirable to have gap 914 between uncompensated composite skin 906 and spar 910. During assembly, a number of shims (not depicted) will be placed between uncompensated composite skin 906 and spar 910. As used herein, a "number of" refers to one or more items. Thus, a number of shims is one or more shims. View 1000 is a cross-sectional view. Gap 914 between uncompensated composite skin 906 and spar 910 may continue into and out of the page along edge 1002 of uncompensated composite skin 906. A number of shims (not depicted) may be placed along the remainder of edge 1002 and spar 910 into and out of the page.

During assembly, a number of shims (not depicted) will be placed between uncompensated composite skin 906 and rib 912. Gap 1004 is produced due to a thickness differential. Gap 1004 may be reduced or eliminated by the design and placement of spar 910 relative to uncompensated composite skin 906.

The placement of the number of shims (not depicted) will take an undesirable amount of time and produce undesirable manufacturing costs. Identification of gap 914 and gap 1004 may be used to compensate for gaps in future composite skins.

For example, at least one of the location of gap 914 or the size of gap 914 may be used to design a slip sheet, such as slip sheet 206 of FIG. 2. A slip sheet, such as slip sheet 206 of FIG. 2 may be designed to compensate for gap 914 in future composite skins formed from composite material laid up on the slip sheet.

As described, uncompensated composite structure 902 is a physical implementation of uncompensated composite structure 234 in FIG. 2. In other illustrative examples, uncompensated composite structure 902 is a simulated implementation of uncompensated composite structure 234 in FIG. 2. By simulating uncompensated composite structure 902 rather than physically laying up and curing a composite material to form uncompensated composite skin 906 and assembling into uncompensated composite structure 902, manufacturing costs may be reduced. By simulating uncompensated composite structure 902 rather than physically laying up and curing a composite material to form uncompensated composite skin 906 and assembling into uncompensated composite structure 902, time to design the slip sheet may be reduced.

As described, uncompensated composite structure 902 is a physical implementation of uncompensated composite structure 234 in FIG. 2 formed from composite material 211 laid up on a forming surface of a layup tool. In some other illustrative examples, uncompensated composite structure 902 is a simulated implementation of composite structure 281 on an intermediate design for a slip sheet, such as slip sheet 206 of FIG. 2. By simulating uncompensated composite structure 902, designs for a slip sheet, such as slip sheet 206, may be tested without physically constructing the slip sheet.

Figure 11:
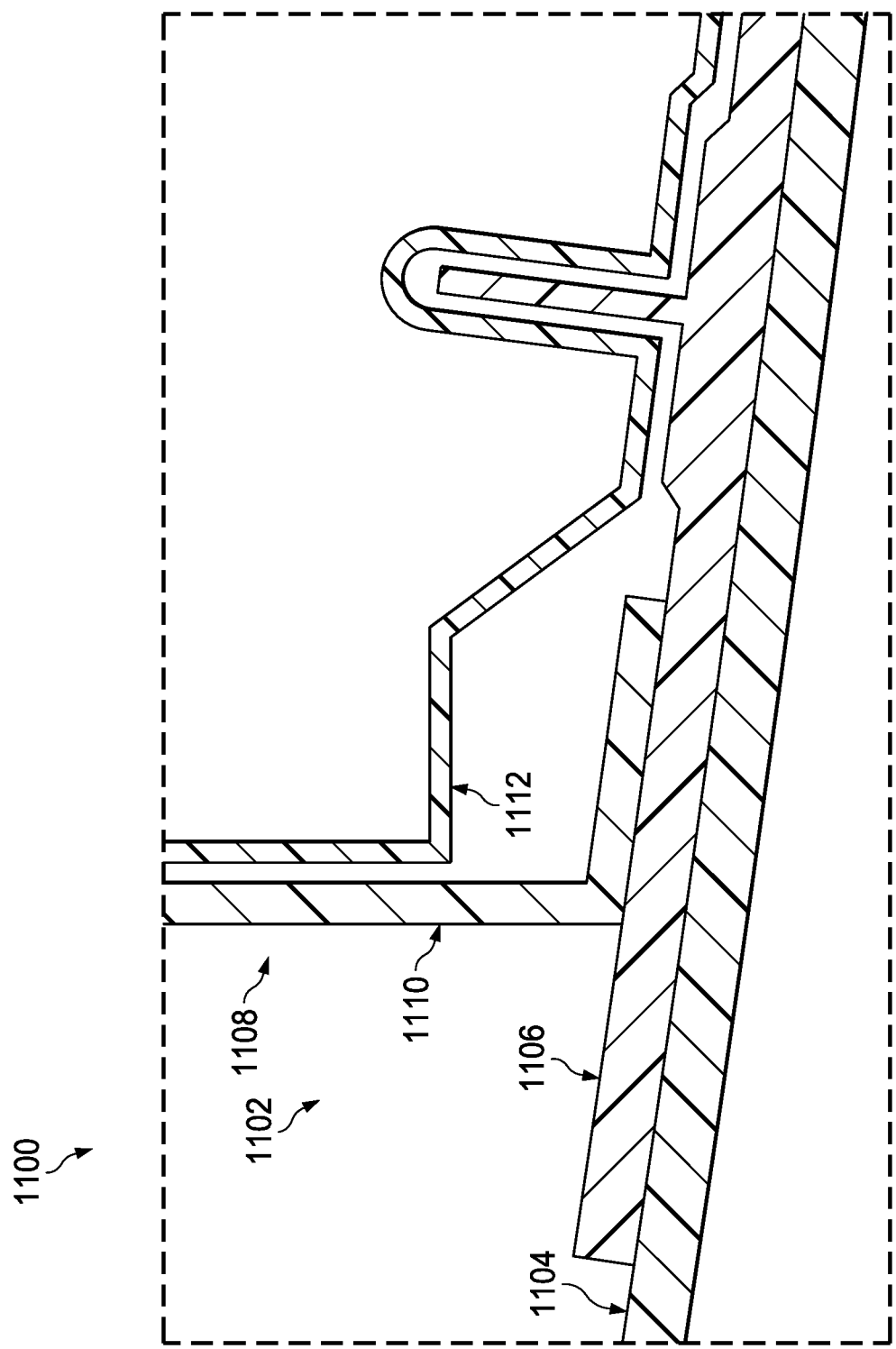
FIG. 11 is an illustration of a cross-sectional view of a composite structure on an assembly tool in accordance with an illustrative embodiment.

Turning now to FIG. 11, an illustration of a cross-sectional view of a composite structure on an assembly tool is depicted in accordance with an illustrative embodiment. View 1100 is a cross-sectional view of composite structure 1102 on assembly tool 1104. Composite structure 1102 is a physical implementation of composite structure 281 of FIG. 2. Assembly tool 1104 is a physical implementation of assembly tool 280 of FIG. 2.

Composite structure 1102 includes composite skin 1106 and support structure 1108. Support structure 1108 includes spar 1110 and rib 1112. Composite skin 1106 is a physical implementation of composite skin 212 of FIG. 2. Composite skin 1106 is formed from composite material laid up on a compensation surface of a slip sheet, such as compensation surface 214 of slip sheet 206 of FIG. 2.

After laying up and curing a composite material to form composite skin 1106, composite skin 1106 is secured on assembly tool 1104. Assembly tool 1104 applies a vacuum to hold composite skin 1106. Assembly tool 1104 applies an allowable force to composite skin 1106 using the vacuum.

Composite skin 1106 is connected to support structure 1108 while composite skin 1106 is held on assembly tool 1104. After releasing the vacuum on composite skin 1106, a load is transferred to the fasteners and support structure 1108.

In view 1100, although uncompensated composite skin 906 and composite skin 1106 have substantially the same design, no gap is present between composite skin 1106 and spar 1110. By laying up a composite material to form composite skin 1106 on a compensation surface of a slip sheet instead of on a forming surface of a layup tool, gap 914 shown in FIG. 9 has been eliminated. As depicted, no gap is present when up to a maximum allowable pull up force is applied to the fasteners (not depicted) and rib 1112 of composite structure 1102.

Assembly tool 1104 is a non-limiting depiction of an assembly system. View 1100 is a cross-sectional view through a portion of assembly tool 1104. View 1100 does not display the entirety of assembly tool 1104. View 1100 displays only a single surface of assembly tool 1104 contacting composite skin 1106. Although not visible in view 1100, assembly tool 1104 may include any desirable number of surfaces with any desirable sizes and any desirable shapes. A physical implementation of assembly tool 280 of FIG. 2 will be designed taking into account designed shape 276 of composite skin 212.

In some illustrative examples, assembly tool 1104 may include a plurality of components each separated from the others and each providing a respective surface contacting composite skin 1106. In these illustrative examples, the plurality of components may be separated moving into or out of the page.

The different components shown in FIG. 1 and FIGS. 3-11 may be combined with components in FIG. 2, used with components in FIG. 2, or a combination of the two. Additionally, some of the components in FIG. 1 and FIGS. 3-11 may be illustrative examples of how components shown in block form in FIG. 2 may be implemented as physical structures.

Figure 12:
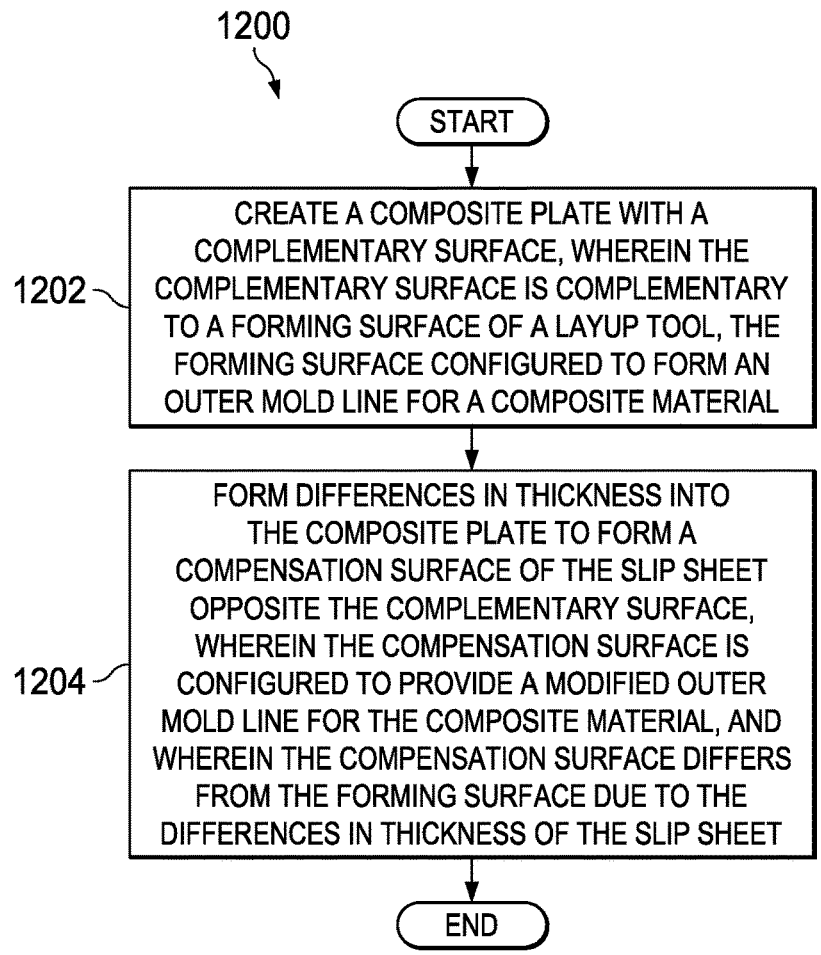
FIG. 12 is an illustration of a flowchart of a method for forming a slip sheet in accordance with an illustrative embodiment.

Turning now to FIG. 12, an illustration of a flowchart of a method for forming a slip sheet is depicted in accordance with an illustrative embodiment. Method 1200 may be used to form slip sheet 206 of FIG. 2. Method 1200 may be used to form slip sheet 306 of FIG. 3. Method 1200 may be used to form slip sheet 602 of FIG. 6.

Method 1200 creates a composite plate with a complementary surface, wherein the complementary surface is complementary to a forming surface of a layup tool, the forming surface is configured to form an outer mold line for a composite material (operation 1202). Method 1200 forms differences in thickness into the composite plate to form a compensation surface of the slip sheet opposite the complementary surface, wherein the compensation surface is configured to provide a modified outer mold line for the composite material, and wherein the compensation surface differs from the forming surface due to the differences in thickness of the slip sheet (operation 1204). Afterwards the process terminates.

In some illustrative examples, forming the differences in thickness comprises cutting peaks and valleys into the composite plate. In some illustrative examples, forming differences in thickness comprises forming differences in thickness in at least one of a first portion or a second portion of the compensation surface, wherein a third portion of the compensation surface has a uniform thickness.

A slip sheet formed using method 1200 is a reusable manufacturing component. In some illustrative examples, a slip sheet formed using method 1200 may be repeatedly used to form composite skins, such as composite skin 212 of FIG. 2. Replacement slip sheets due to design changes may be manufactured according to method 1200.

Figure 13:
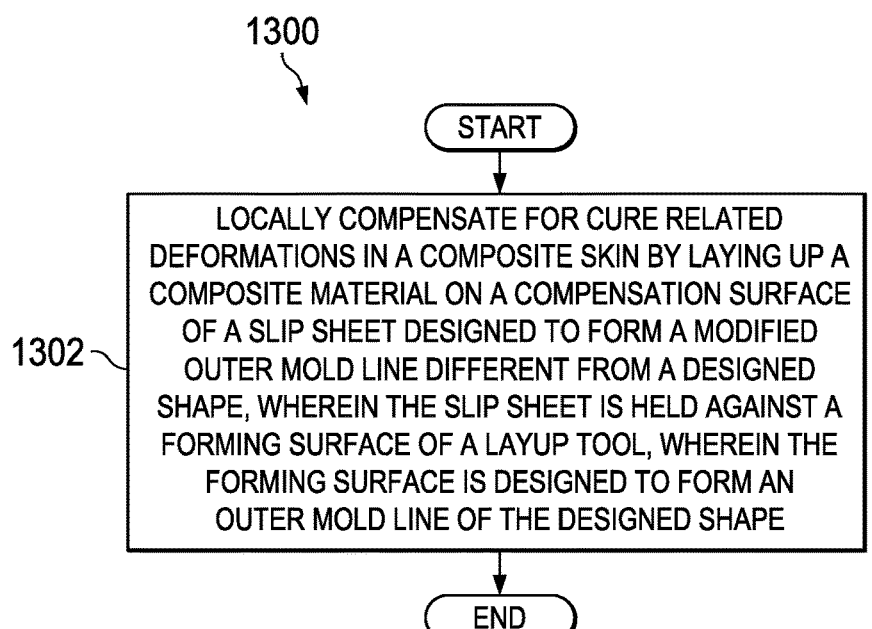
FIG. 13 is an illustration of a flowchart of a method for forming a composite skin in accordance with an illustrative embodiment.

Turning now to FIG. 13, an illustration of a flowchart of a method for forming a composite skin is depicted in accordance with an illustrative embodiment. Method 1300 may be used to form composite skin 212 of FIG. 2. Method 1300 may be used to form a composite skin using slip sheet 306 of FIG. 3. Method 1300 may be used to form a composite skin using slip sheet 700 of FIG. 7. Method 1300 uses a slip sheet, such as a slip sheet created using method 1200 of FIG. 12.

Method 1300 locally compensates for cure related deformation in a composite skin by laying up a composite material on a compensation surface of a slip sheet designed to form a modified outer mold line different from a designed shape, wherein the slip sheet is held against a forming surface of a layup tool, wherein the forming surface is designed to form an outer mold line of the designed shape (operation 1302). Afterwards, the method terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

For example, method 1200 may further comprise securing the slip sheet to a layup tool such that the complementary surface contacts the forming surface of the layup tool. In some examples, method 1200 further comprises laying up an uncompensated composite skin on the forming surface of the layup tool, curing the uncompensated composite skin, applying up to a maximum allowable force to the uncompensated composite skin by an assembly tool after curing, measuring the inner mold line of the uncompensated composite skin while the uncompensated composite skin is held by the assembly tool, and designing the differences in thickness of the compensation surface based on a difference between the inner mold line of the uncompensated composite skin and a designed shape.

In some illustrative examples, in method 1200, designing the differences in thickness of the compensation surface take into account resin characterization and thermodynamics for curing and cooling of the composite material. In some illustrative examples, method 1200 further comprises performing simulations of: laying up a composite material on the forming surface of the layup tool, curing the composite material to form an uncompensated composite skin, attaching a support structure, and applying up to a maximum allowable force to the uncompensated composite skin by an assembly tool after curing; determining the inner mold line of the uncompensated composite skin during simulation of the uncompensated composite skin held by the assembly tool; and creating a design for a slip sheet based on differences between the inner mold line of the simulated uncompensated composite skin and a designed shape.

In some further illustrative examples, method 1200 also further comprises performing simulations of laying up a composite material on a compensation surface of a slip sheet, curing the composite material to form a composite skin, and applying up to a maximum allowable force to the composite skin by an assembly tool after curing; determining the inner mold line of the composite skin during simulation of the composite skin held by the assembly tool; and modifying a design for the slip sheet based on the simulations, wherein the differences in thickness are formed into the composite plate based on the design for the slip sheet.

In some illustrative examples, method 1300 further comprises curing the composite material on the slip sheet to form a composite skin, wherein the composite skin has a cured outer mold line different from the modified outer mold line. In some illustrative examples, the cured outer mold line is part of a cured shape of the composite skin, and method 1300 yet further comprises applying up to a maximum allowable force to the composite skin by an assembly tool after curing to reduce angular differences between the cured shape and the designed shape.

Figure 14:
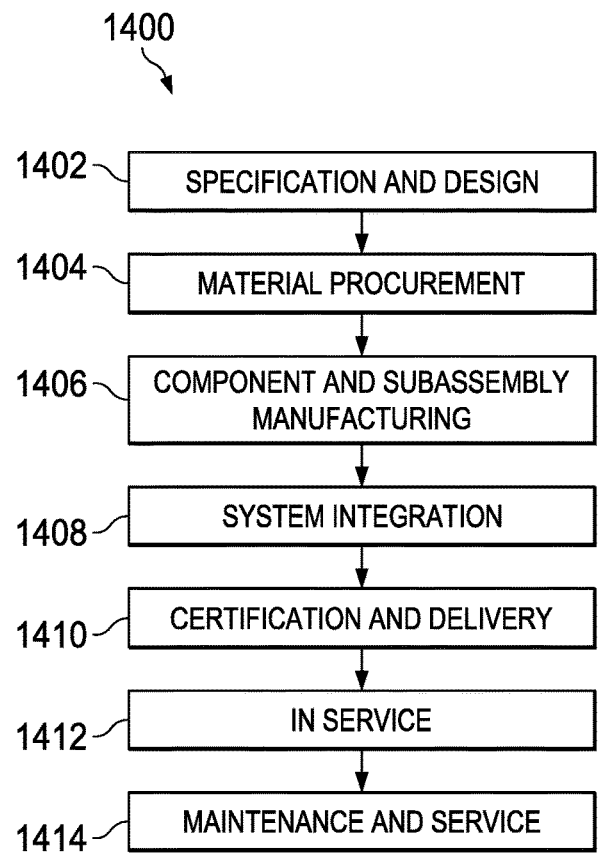
FIG. 14 is an illustration of an aircraft manufacturing and service method in the form of a block diagram in accordance with an illustrative embodiment.
Figure 15:
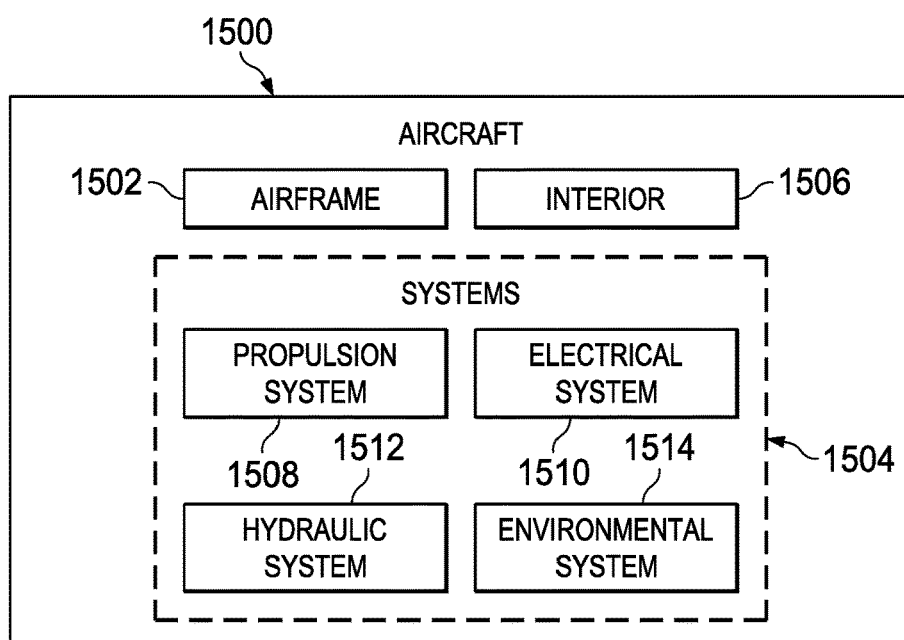
FIG. 15 is an illustration of an aircraft in the form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 of FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 1406, system integration 1408, or maintenance and service 1414 of FIG. 14. For example, system 202 of FIG. 2 may be used during component and subassembly manufacturing 1406 to lay up composite skin 212 of FIG. 2. Composite skin 212 of FIG. 2 may be joined to support structure 266 of FIG. 2 during component and subassembly manufacturing 1406 after method 1300 of FIG. 13.

Composite skin 212 of FIG. 2 may be connected to aircraft 1500 during system integration 1408. System 202 of FIG. 2 may be used to form replacement components used during maintenance and service 1414 of FIG. 14. For example, system 202 may process composite skin 212 to form replacement components used during maintenance and service 1414 of FIG. 14. Support structure 266 of FIG. 2 may be at least a component of airframe 1502.

The illustrative embodiments provide a system for correcting deformations in large composite wing structures. In the system, a mandrel comprises an initial design surface. A slip sheet is a machined layer comprising features providing a predicted force for correcting deformations during a cure cycle of the large composite wing structure.

In some illustrative examples, the slip sheet consists of a thin (e.g. 0.25 inches thick) carbon fiber insert that rests on the layup tool/mandrel, that is the same shape as the layup tool in some portions of the layup tool. In some illustrative examples, the slip sheet has the same shape as the layup tool except in the last 6 to 12 inches near the leading edge and the trailing edge of the skin.

In the localized region of the slip sheet, the shape has been compensated slightly to account for the 0.030 to 0.080 inch gap that remains after the allowable pull-up loads have been applied to the composite skin during assembly with a support structure.

Using a slip sheet as in the illustrative examples has many benefits. The gages/design of an aircraft wing can change during the fabrication cycle of the layup tool. Modification or replacement of a slip sheet is easier than re-making the entire tool.

Remaking a slip sheet is also a lower cost alternative than remaking an entire layup tool. Remaking a slip sheet is also faster than remaking an entire layup tool. A slip sheet has a lower complexity than a layup tool. The slip sheet shape may have the same or similar indexing features and other engineering/design features as the forming tool. In other illustrative examples, because the slip sheet is connected to the forming tool, indexing features of the forming tool may be located, inspected, and used for manufacturing processes.

The slip sheet is designed to correct only the angular displacement due to curing. The slip sheet is not designed to correct gaps due to thickness variations. In some illustrative examples, angular displacement is on the order of 0.030 to 0.080. The illustrative examples present a shallow insert that goes between the layup tool and the part.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a layup tool with a forming surface designed to form an outer mold line for a composite material; and
   a slip sheet with a compensation surface configured to provide a modified outer mold line for the composite material and a complementary surface configured to rest on the forming surface, wherein the compensation surface differs from the forming surface due to differences in thickness of the slip sheet, and wherein the compensation surface is opposite the complementary surface.

2. The system of claim 1, wherein the compensation surface is configured to provide compensation for a plurality of gaps between a support structure and an uncompensated composite skin, wherein the uncompensated composite skin comprises composite material laid up on the forming surface and cured.

3. The system of claim 2, wherein the compensation surface comprises the differences in thickness configured to provide the compensation.

4. The system of claim 1, wherein the compensation surface is configured to eliminate gaps of up to 0.10 inch between a first portion of a composite skin and a support structure during assembly, wherein the composite skin is the composite material laid up on the compensation surface and cured.

5. The system of claim 4, wherein the gaps are eliminated after applying up to a maximum allowable force to the first portion of the composite skin.

6. A method comprising:
creating a composite plate with a complementary surface, wherein the complementary surface is complementary to a forming surface of a layup tool, the forming surface configured to form an outer mold line for a composite material; and
forming differences in thickness into the composite plate to form a compensation surface of a slip sheet opposite the complementary surface, wherein the compensation surface is configured to provide a modified outer mold line for the composite material, and wherein the compensation surface differs from the forming surface due to the differences in thickness of the slip sheet.

7. The method of claim 6, wherein forming the differences in thickness comprises cutting peaks and valleys into the composite plate.

8. The method of claim 6 further comprising:
securing the slip sheet to the layup tool such that the complementary surface contacts the forming surface of the layup tool.

9. The method of claim 6 further comprising:
laying up a composite material on the forming surface of the layup tool;
curing the composite material to form an uncompensated composite skin;
applying up to a maximum allowable force to the uncompensated composite skin by an assembly tool after curing;
measuring an inner mold line of the uncompensated composite skin while the uncompensated composite skin is held by the assembly tool; and
designing the differences in thickness of the compensation surface based on a difference between the inner mold line of the uncompensated composite skin and a designed shape.

10. The method of claim 6 further comprising:
performing simulations of: laying up a composite material on the forming surface of the layup tool, curing the composite material to form an uncompensated composite skin, and applying up to a maximum allowable force to the uncompensated composite skin by an assembly tool after curing;
determining an inner mold line of the uncompensated composite skin during simulation of the uncompensated composite skin held by the assembly tool; and
creating a design for the slip sheet based on differences between the inner mold line of a simulated uncompensated composite skin and a designed shape.

11. The method of claim 10, wherein the design for the slip sheet takes into account resin characterization and thermodynamics for curing and cooling of the composite material of the uncompensated composite skin.

12. The method of claim 10 further comprising:
performing simulations of: laying up a composite material on the compensation surface of the slip sheet, curing the composite material to form a composite skin, and applying up to the maximum allowable force to the composite skin by the assembly tool after curing;
determining the inner mold line of the composite skin during simulation of the composite skin held by the assembly tool; and
modifying the design for the slip sheet based on the simulations, wherein the differences in thickness are formed into the composite plate based on the design for the slip sheet.

13. The method of claim 6, wherein forming the differences in thickness comprises forming the differences in thickness in at least one of a first portion or a second portion of the compensation surface, wherein a third portion of the compensation surface has a uniform thickness.

14. The method of claim 8, further comprising:
locally compensating for cure related deformations in a composite skin by laying up the composite material on the compensation surface of the slip sheet designed to form the modified outer mold line different from a designed shape, wherein the slip sheet is held against a forming surface of a layup tool, wherein the forming surface is designed to form an outer mold line of the designed shape.

15. The method of claim 14 further comprising:
curing the composite material on the slip sheet to form a composite skin, wherein the composite skin has a cured outer mold line different from the modified outer mold line.

16. The method of claim 15, wherein the cured outer mold line is part of a cured shape of the composite skin, the method further comprising:
applying up to a maximum allowable force to the composite skin by an assembly tool after curing to reduce angular differences between the cured shape and the designed shape.

17. The method of claim 7, wherein the differences in thickness include peaks and valleys having a height in a range of 0.050 inches to 0.150 inches.

18. The method of claim 7, wherein the differences in thickness are present in a first portion and a second portion of the compensation surface, and wherein the first portion and the second portion are separated by a third portion of the compensation surface, wherein the third portion has a uniform thickness.

19. The method of claim 18, wherein the third portion is the same as a respective portion of the forming surface of the layup tool, and wherein the first portion and second portion are different from corresponding portions of the forming surface of the layup tool.

20. The method of claim 6, wherein the slip sheet has a non-uniform cross-section.

21. The method of claim 6, wherein the modified outer mold line is configured to adjust angular displacement of a composite skin, wherein the composite skin is the composite material laid up on the compensation surface and cured.

22. The method of claim 6, wherein the compensation surface is configured to eliminate gaps of up to 0.10 inch between a first portion of a composite skin and a support structure during assembly, wherein the composite skin is the composite material laid up on the compensation surface and cured.

* * * * *